No. 822,788. PATENTED JUNE 5, 1906.
G. TUTHILL & W. H. BOYD.
PROTECTOR FOR HORSES' TAILS.
APPLICATION FILED MAY 6, 1905.

2 SHEETS—SHEET 1.

Witnesses
Jos H Blackwood
Jennie D. Gregory

Inventors
George Tuthill and
William H Boyd.
By James K. Polk
Attorney

No. 822,788. PATENTED JUNE 5, 1906.
G. TUTHILL & W. H. BOYD.
PROTECTOR FOR HORSES' TAILS.
APPLICATION FILED MAY 6, 1905.

2 SHEETS—SHEET 2.

Witnesses
Jas. H. Blackwood
Jennie D. Gregory

Inventors
George Tuthill &
William H. Boyd
by James K. Polk
Attorney

UNITED STATES PATENT OFFICE.

GEORGE TUTHILL AND WILLIAM H. BOYD, OF PORTLAND, OREGON.

PROTECTOR FOR HORSES' TAILS.

No. 822,788.  Specification of Letters Patent.  Patented June 5, 1906.

Application filed May 6, 1905. Serial No. 259,197.

*To all whom it may concern:*

Be it known that we, GEORGE TUTHILL and WILLIAM H. BOYD, citizens of the United States, residing at Portland, in the county of Multnomah and State of Oregon, have invented certain new and useful Improvements in Protectors for Horses' Tails, of which the following is a specification.

Our invention relates to inventions for protecting horses' tails, and has for its object the provision of a device that is secured to the animal while in his stall and is adapted to prevent him from rubbing his tail against the sides of the stall.

To this end our invention consists of a device having two bars secured one on each side of the dock, having bars to connect them together and pass around the dock, the whole device being held in place by straps secured to a girth passed around the horse.

The construction and operation of our invention will be described in detail hereinafter and illustrated in the accompanying drawings, in which—

Figure 1:
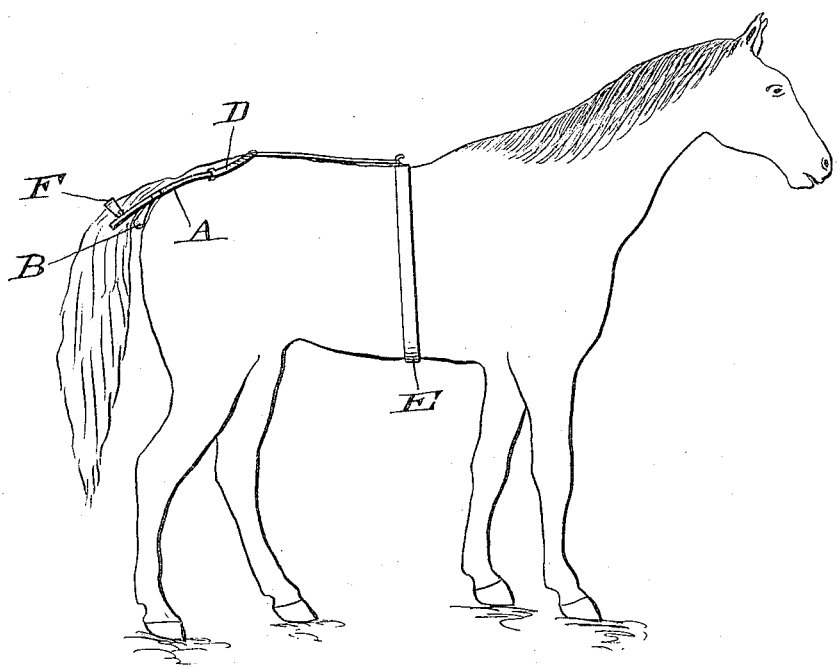
Figure 3:
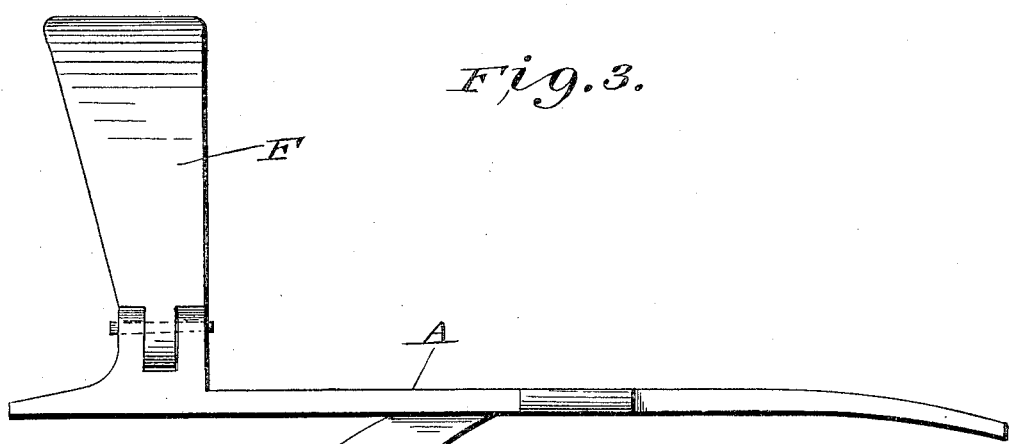
Figure 2:
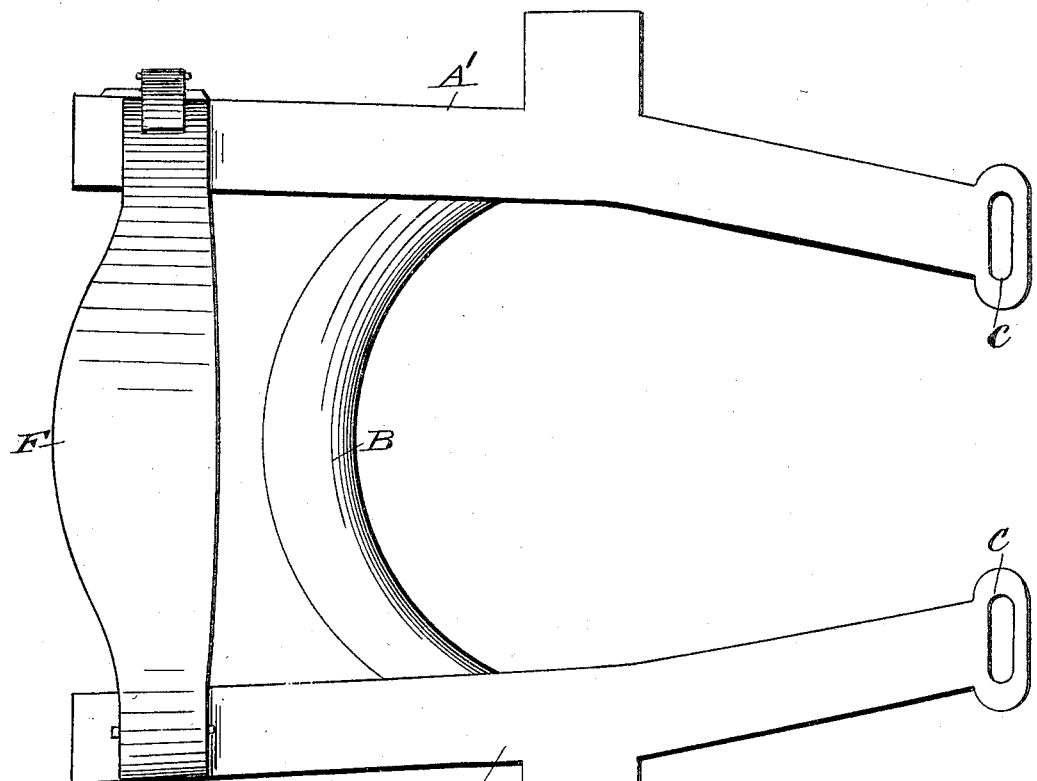
Figure 4:
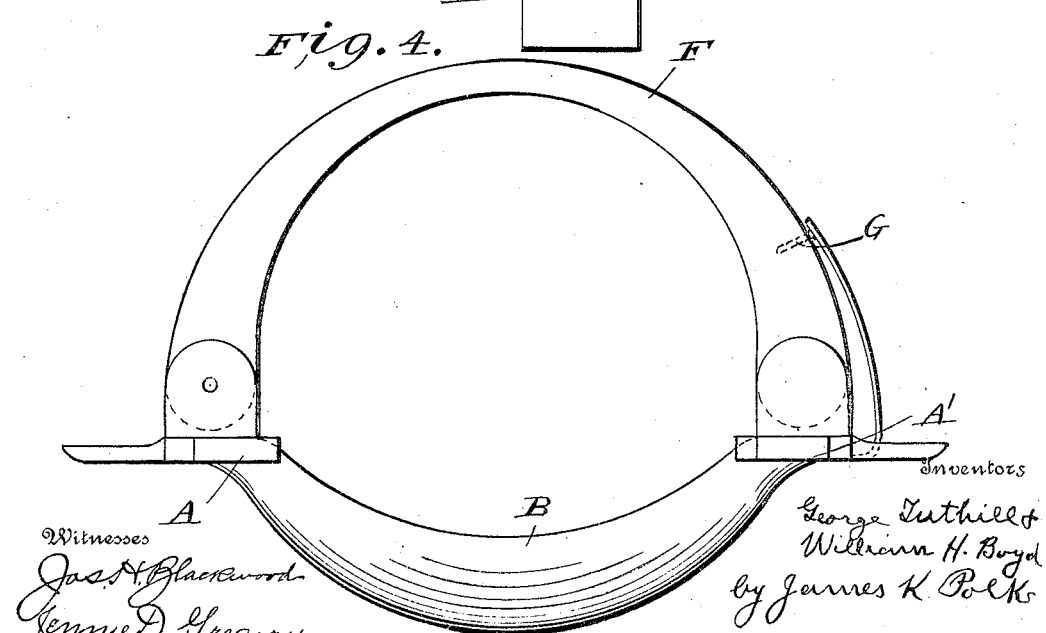

Figure 1 is a representation of a horse, showing our invention secured thereto; Fig. 2, a top plan view of the tail-protector; Fig. 3, a side view, and Fig. 4 an end view In the drawings similar reference characters indicate corresponding parts throughout the several views.

A A' represent two straight bars connected by means of a curved bar B, adapted to lie under the animal's tail when in position, as shown in Fig. 1, and having loops C C in their forward ends to receive the ends of a forked strap D, that is in turn secured to a girth E, secured around the animal's middle.

F represents a curved bar pivotally secured to one of the straight bars A and adapted to be secured to the other bar A' by means of a leaf-spring secured to said bar A' and having a pin G to seat in a hole in said bar F. Bar F is secured over the animal's tail.

When in position, as shown in Fig. 1, our invention will prevent the animal from rubbing its tail against the sides of the stall, the bars A A' receiving the abrasion and discourages the habit. It will thus be seen that our invention prevents the tail from becoming unsightly because of the hairs that are broken and pulled out as the result of this habit.

Having thus described our invention, what we claim is—

1. A device of the character described consisting of bars adapted to rest on each side of a horse's tail, a cross-bar secured to said bars and adapted to seat under the tail, and a bar pivotally secured to one bar and adapted to be secured to the other bar, the last-named bar adapted to rest on top of the animal's tail, substantially as shown and described.

2. A device of the character described consisting of two straight bars one of which is adapted to rest on each side of a horse's tail, and curved bars connecting said straight bars and adapted to pass under and over the tail, one of said curved bars being pivotally secured to the straight bar on one side of the tail and removably secured to the other straight bar, substantially as shown and described.

3. A device of the character described consisting of two straight bars, one of which is adapted to rest on each side of a horse's tail, a curved bar connecting the straight bars and adapted to seat under the horse's tail, and a curved bar pivotally secured to one straight bar adapted to be secured to the other straight bar and to rest on top of the horse's tail, substantially as shown and described.

4. A device of the character described consisting of two straight bars one of which is adapted to rest on each side of a horse's tail, cross-bars connecting said straight bars and adapted to pass over and under the tail, one of said cross-bars being pivotally secured to the straight bar on one side of the tail and removably secured to the other straight bar, a girth secured around the animal, and a strap secured to said girth and to each of said straight bars, substantially as shown and described.

5. A device of the character described consisting of two straight bars, one of which is adapted to rest on each side of a horse's tail, curved bars connecting said straight bars adapted to pass under and over the tail, the curved bar adapted to pass over the tail being pivotally secured to one of said straight bars and removably secured to the other straight bar, a girth to be secured around the animal, and a strap secured to said girth and having its ends forked to be secured to the ends of said straight bars, substantially as shown and described.

6. A device of the character described consisting of two straight bars, one of which is adapted to rest on each side of a horse's tail, a curved bar connecting the straight bars and adapted to seat under the horse's tail, a curved bar pivotally secured to one straight bar and adapted to be secured to the other straight bar and rest on top of the horse's tail, a girth secured around the animal, and a strap secured at one end to the girth and having its other end forked and secured to the ends of said straight bars, substantially as shown and described.

In witness whereof we have hereunto set our hands in presence of two subscribing witnesses.

GEORGE TUTHILL.
WILLIAM H. BOYD.

Witnesses:
O. L. PRICE,
H. M. COKE.